United States Patent [19]
Huang

[11] Patent Number: 5,537,022
[45] Date of Patent: Jul. 16, 1996

[54] ENCLOSED BATTERY HOLDER

[76] Inventor: Yu-Huei Huang, 5F, No. 3-1, Lane 191, Young Ho Road, Chung Ho City, Taipei Hsien, Taiwan

[21] Appl. No.: 517,618

[22] Filed: Aug. 22, 1995

[51] Int. Cl.[6] .............................. H02J 7/00; H01M 2/10
[52] U.S. Cl. .................................... 320/2; 429/99
[58] Field of Search .................................. 320/2; 429/96, 429/97, 99, 100, 23; 362/196, 200

[56] References Cited

U.S. PATENT DOCUMENTS

| | | | |
|---|---|---|---|
| 4,161,568 | 7/1979 | Lund | 429/99 |
| 4,754,378 | 6/1988 | Chen | 362/196 |
| 5,431,575 | 7/1995 | Engira | 429/99 X |
| 5,471,667 | 11/1995 | Yamada | 429/100 X |

*Primary Examiner*—Peter S. Wong
*Assistant Examiner*—Patrick B. Law
*Attorney, Agent, or Firm*—Bacon & Thomas

[57] ABSTRACT

An enclosed battery charger including a seat, a cover, and a conductive metal plate means. The seat is provided with a partition which has one end thereof extending upwardly to form a partition rib for preventing contact of two conductive metal plates. A front wall of the seat is provided with an inverted-L shaped hook piece, and a rear wall of the seat is provided with an engaging hole. The cover is provided with a rib having a rib section projected from an inner side thereof. The rib and rib section of the cover enclose a rib of the seat. The cover also has a hook piece which is retained by the engaging hole. The cover further has a slot corresponding to the hook piece of the front wall. A push-button switch and a metal piece are further provided to control connection of electricity. A post is disposed in the seat for preventing the wires and the conductive metal plates from slipping off. In addition, an insulated plate is passed through a slot in the cover to be disposed between the batteries and the conductive metal plates for preventing abnormal electricity discharge.

6 Claims, 4 Drawing Sheets

ENCLOSED BATTERY HOLDER

BACKGROUND OF THE INVENTION (a) Field of the Invention

The present invention relates generally to a battery charger, and more particularly to an enclosed battery charger.

The development of dry batteries has been for quite a long time. This kind of storing electric power within a columnar body to supply power at times of necessity does facilitate our use of certain electrical appliances. It breaks through the restriction of conventional power source and provides considerable convenience in our daily life.

There are devices available in the market for holding storing dry batteries. The placement and keeping of dry batteries are often connected with the electrical appliances or products used, such as toys, portable radios, hand torches, etc. There are also some dry batteries which are stored separately from the electrical appliances used. In addition, there are also battery chargers for keeping rechargeable nickel-cadmium batteries, which may be recharged when the battery chargers are connected to an A-C electric power source which is rectified to lower its voltage.

(b) Description of the Prior Art

The common major characteristic of these battery storing devices is that the electrical circuits in most of them are connected in series due to the voltage required. Take the known battery chargers as an example, the batteries are usually arranged two in a set, but connection of the circuit is in series.

As shown in FIG. 1 of the drawings, a conventional battery charger consists of a seat 10 provided with a couple of negative springs 101 and a couple of positive plates 102, each of which being connected by lead wires. The batteries are placed in a compartment 103 of the seat 10. Both lateral walls of the compartment 103 integrally extend upwardly to form a plurality of corresponding curved wings 104, which has a curve corresponding to the curve of the batteries for preventing the batteries from slipping out. However, there are a number of drawbacks when this kind of battery charger is used in certain electrical appliances and products. For instance, the batteries are not effectively ensured against contact with liquid, which may easily cause leakage or short-circuit of the batteries. The curved wings 104, which are made of elastic material, may not effectively prevent the batteries from slipping out. But if the curved wings 104 are configured to be longer in size, it will be very inconvenient to place the batteries; if they are made shorter, they cannot prevent the batteries from slipping out. Additionally, the lead wires may cause short-circuit. If the batteries are included in the battery chargers when they are delivered ex factory, the lead wires may get connected and cause short-circuit during transportation and storage, so that all the battery power is exhausted.

SUMMARY OF THE INVENTION

A primary object of the present invention is to provide an enclosed battery charger to eliminate the drawbacks in the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

As shown in the accompanying drawings, the enclosed battery charger according to the present invention essentially comprises a seat 1, a cover 2 and a conductive metal plate means 3.

Figure 1:
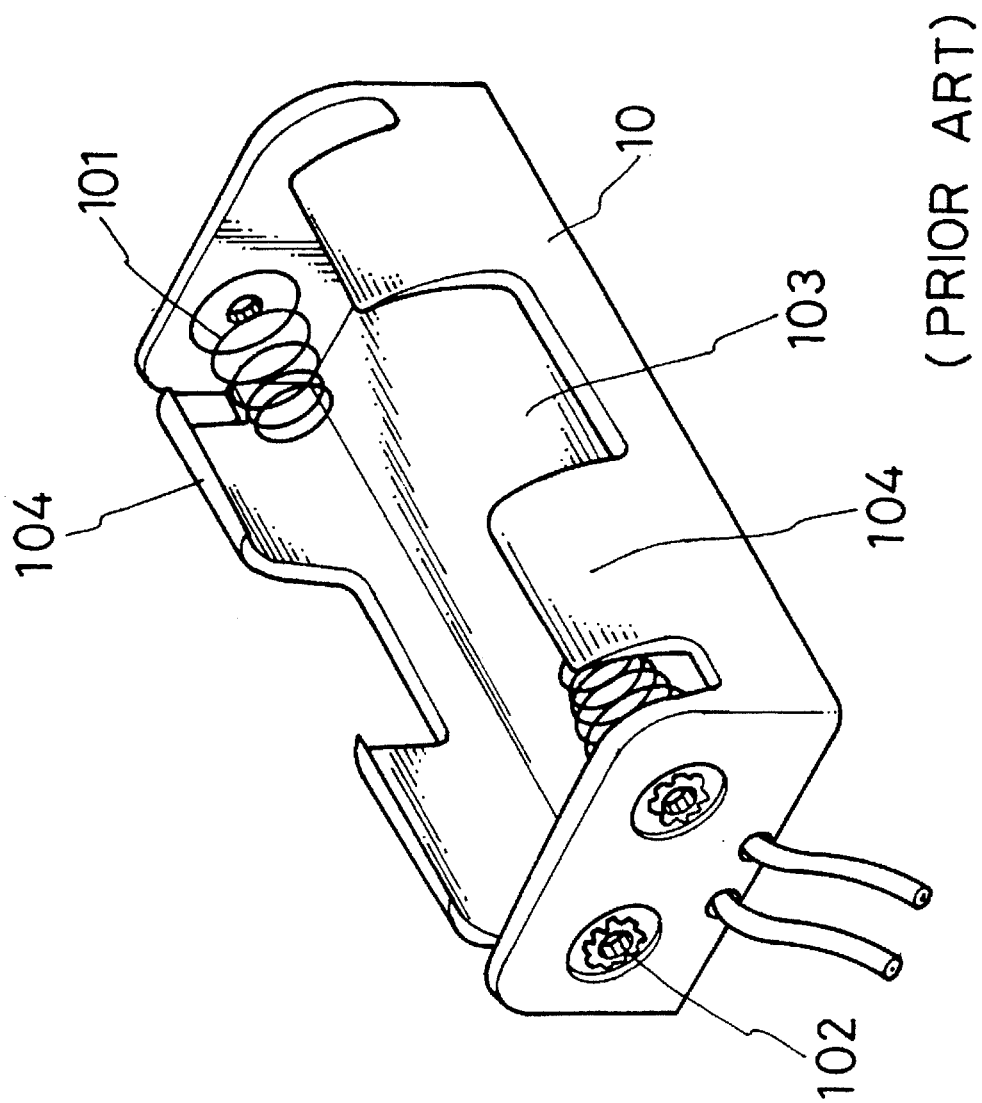
FIG. 1 is a perspective view of the convention battery charger.
Figure 2:
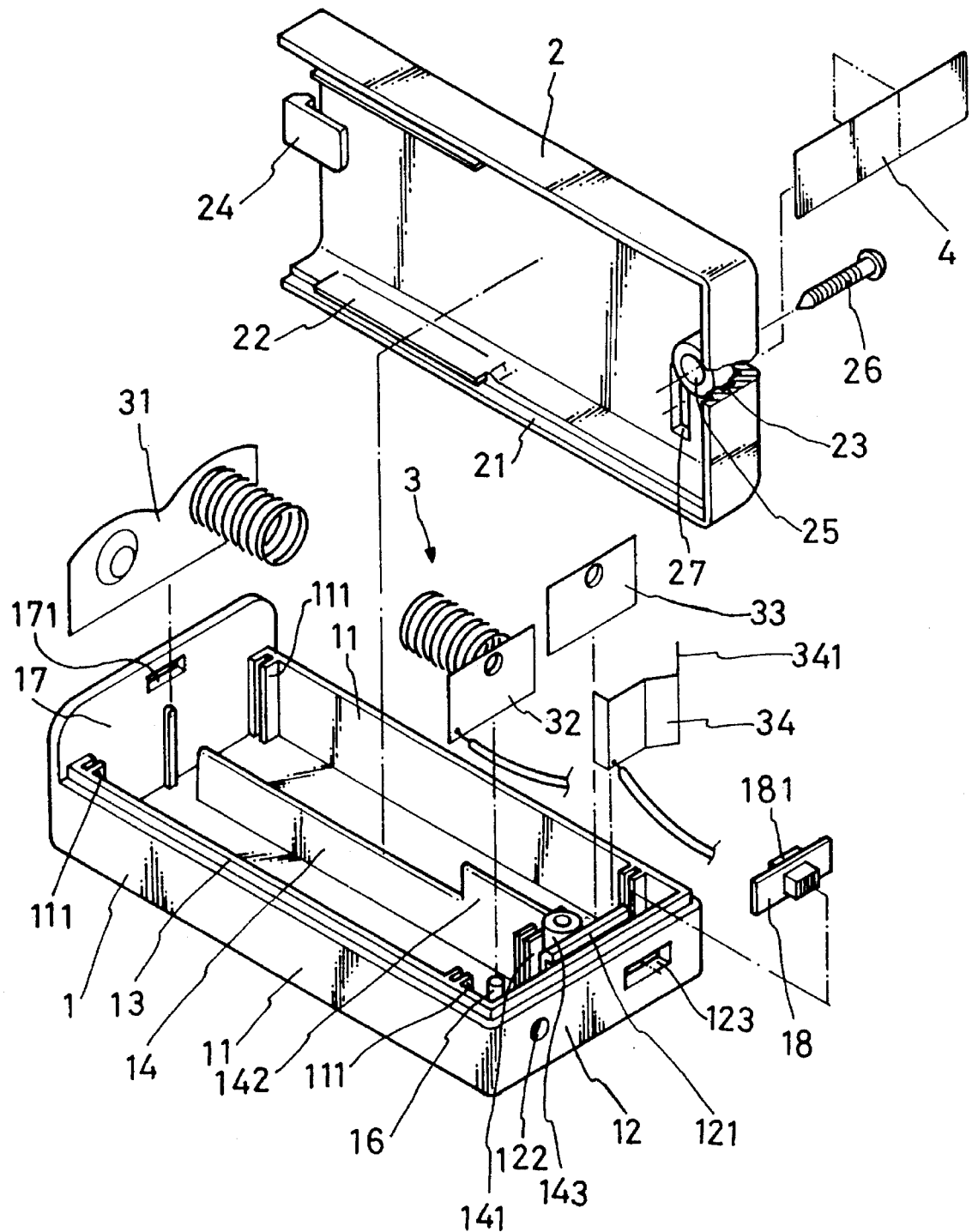
FIG. 2 is a perspective exploded schematic view of the battery charger of the present invention.
Figure 3:
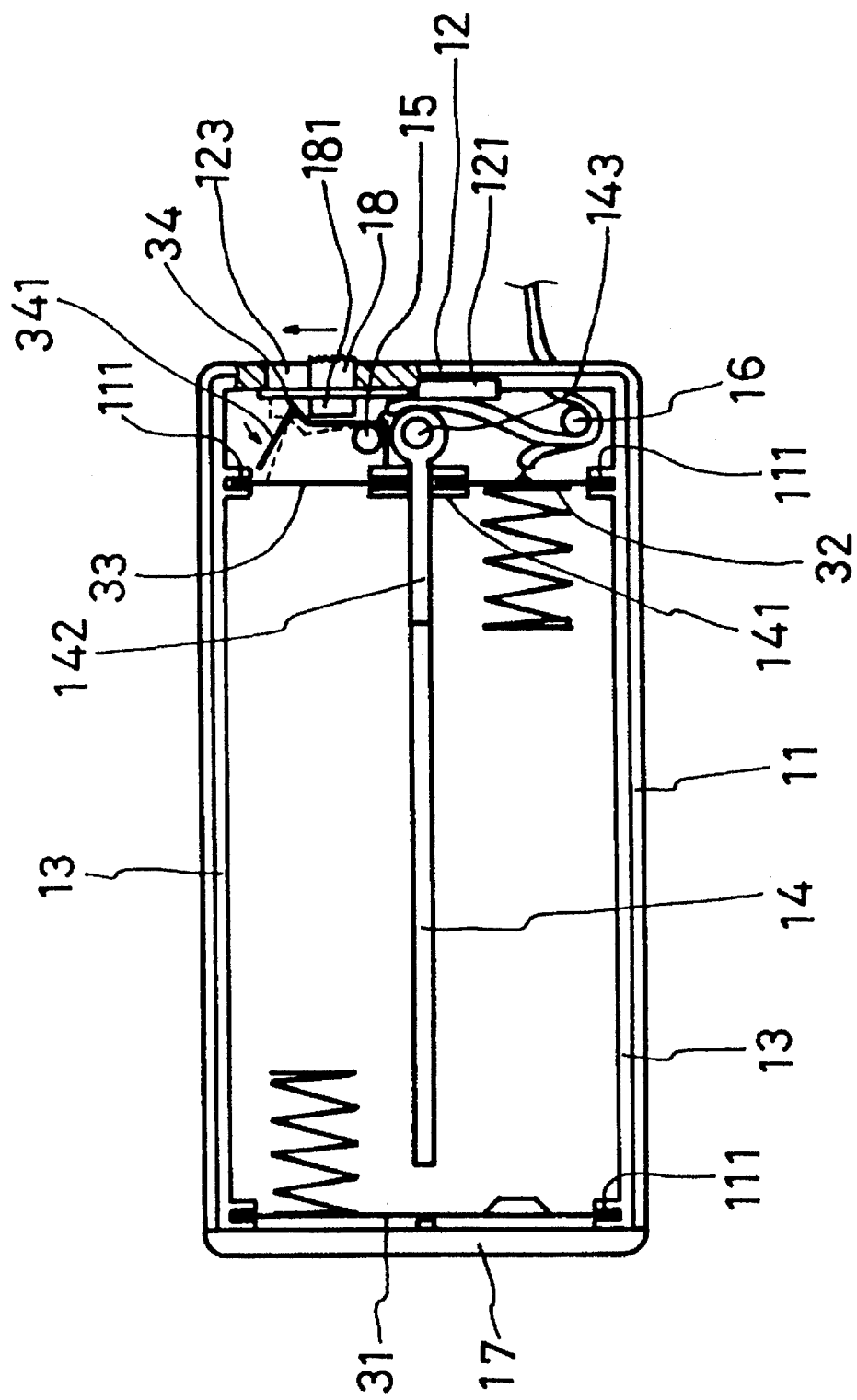
FIG. 3 is a top view of the battery charger of the present invention without a cover.
Figure 4:
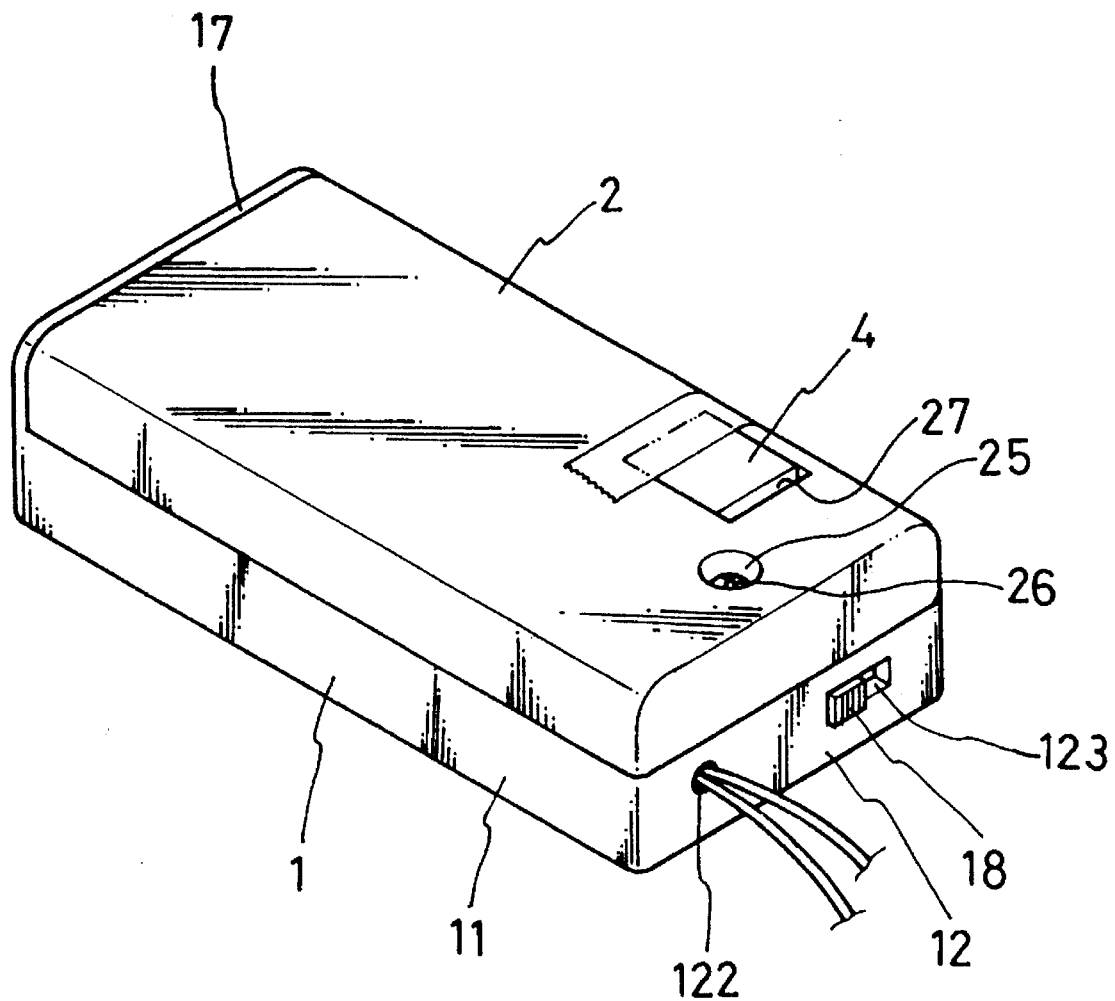
FIG. 4 is a perspective view of the battery charger of the present invention in a fully assembled state.

The seat 1 is a semi-closed rectangular case. A couple of vertically grooved supports 111 integrally extend in a longitudinal direction from the either end portion of each of the lateral walls 11 of the seat 1 for receiving the conductive metal plate means 3. Both lateral walls 11 and a front wall 12 are also provided with ribs 13 at an upper edge thereof so that the cover 2 may slide therealong. The enclosed battery charger of the present invention is distinguished from the conventional battery chargers in that a partition 14 is disposed between the two lateral walls 11 for separating the batteries. One end of the partition 14 is provided with a vertically grooved support 141 at a position corresponding to that of the vertically grooved support 111 near the front wall 12. One side of the partition 14 is further provided with a partition rib 142 and a partition post 143, in which the partition rib 142 is used to prevent contact between two conductive metal plates, while the partition post 143 is utilized to help secure the seat 1 firmly to the cover 2. An upper portion of the front wall 12 additionally extends upwardly to form an inverted-L shaped hook piece 121 for engaging the cover 2. A hole 122 is formed in the front wall 12 for passage of lead wires therethrough, and a rectangular opening 123 is also disposed in the front wall 12 for accommodating a push-button switch 18. The switch 18 has a lug 181 on an opposite side thereof. Furthermore, one side of the partition post 143 extends to form a positioning post 15 (see FIG. 3) for positioning a spring piece 34. A post 16 is also disposed adjacent the hole 122 of the front wall 12 for the lead wires to pass therearound. A rear wall 17 is provided at an end of the seat 10 opposite to the front wall 12. A rectangular engaging hole 171 is disposed in an upper portion of the rear wall 17 for engaging the cover 2.

The cover 2 is a a rectangular body having a rib 21 at a position corresponding to that of the rib 13 of the seat 1. The left and right sides of the rib 21 respectively extends inwardly to form a rib section 22. After the cover 2 and the seat 1 are engaged, the rib section 22 and the rib 21 may enclose the rib 13 of the seat 1 so that, after the cover 2 is fitted onto the seat 1, the cover 2 may be slid thereupon. In addition, the cover 2 is provided with a slot 23 at a position corresponding to that of the hook piece 121 of the front wall 12 of the seat 1 to enable the engagement of the cover 2 and the front wall 12. The cover 2 is also provided with a hook piece 24 at a rear end thereof at a position corresponding to that of the engaging hole 171. At a position corresponding to that of the partition post 143, the cover 2 is provided with a hole 25 for passage of screws 26 therethrough to be locked firmly in the partition post 143.

The conductive metal plate means 3 consists of first conductive metal plate 31 which is insertably arranged in the oppositely facing vertically grooved supports 111 near the rear wall 17. A second conductive metal plate 32 and a third conductive metal plate 33 are respectively arranged between the vertically grooved supports 111 and 143 to the left and right of the partition 14 near the front wall 12. An outer side of the third conductive metal plate 33 is further provided with a bent elastic metal piece 34 which is securely disposed in the seat 1 by means of the positioning post 15, so that when a button of the switch 18 displaces upwardly within the opening 13, the lug 181 may compel an end 341 of the metal piece 34 to contact the third conductive metal plate 33 to connect electricity. In addition, the second conductive metal plate 32 and the metal piece 34 are welded to lead wires which pass around the post 16 and exit through the hole 122.

In assembling the battery charger of the present invention, the conductive metal plate means 3 is firstly inserted in the vertically grooved supports 111 and the opposite vertically grooved supports 141; the metal piece 34 and the positioning post 15 are then connected together. The button of the switch 18 is projected through the opening 123. Two lead wires are then passed around the post 16 and out through the hole 122. Subsequently the batteries are placed in the seat 1, and the cover 2 is fitted in place on top of the seat 1, so that the rib 21 and rib section 22 of the cover 2 enclose the rib 13 of the seat 1 to enable the cover 2 to slidably move along the rib 13 of the seat 1. Then the hook piece 24 is caused to engage the engaging hole 171 of the rear wall 17 of the seat 1, with the hook piece 121 of the front wall 12 retained by the slot 23 of the cover 2. The seat 1 and the cover 2 of the battery charger are then firmly secured together. Finally, screws 26 are passed through the hole 25 of the cover 2 into the partition post 143 to fasten them together. Assembly of the battery charger of the present invention is thus accomplished.

Furthermore, the cover 2 may be provided with an elongated slot 27 at a position corresponding to that of the third conductive metal plate 33 for insertion of an insulated plate 4 therethrough to .prevent the third conductive metal plate 33 from contacting the batteries, so as to avoid battery leakage during transportation or assembly. The insulated plate 4 is preferably made of foldable high-molecular sheet, so that it may adhere well to the cover 2. And in use, it is only necessary to remove the insulated plate 4 from the slot 27 to allow contact between the third conductive metal plate 33 and the electrodes of the batteries.

The advantages achieved by the battery charger of the present invention are as follows:

1. Since the battery charger of the present invention is an enclosed type, infiltration of liquid into the charger may be effectively prevented, and the batteries may be firmly kept in place, eliminating the drawbacks in the prior art.

2. Because the seat is provided with a rib which is gripped firmly by the rib and rib section of the cover, and because holes and hook pieces are provided to strengthen the connection between the cover and the seat, the cover and the seat are securely connected after they are fully assembled.

3. Since the lead wires are passed around the post, even if they are pulled at, they may not easily detach from the conductive metal plates welded thereto, hence reducing the rate of faulty products.

4. As the battery charger of the present invention is provided with a push-button switch which, when pushed, may cause the vertically grooved support to press against an end of the elastic metal piece so that it contacts the batteries to connect electricity. Conversely, retrieval of the metal piece means disconnection of electricity. Therefore, when installing the battery charger of the invention on an electrical appliance, it is not necessary to provide an additional switch means.

5. The battery charger of the invention is provided with good insulation means. The projecting rib of the partition may prevent contact between two conductive metal plates, while the arrangement of the slot may separate the batteries and the conductive metal plates by means of the insulated plate disposed in the slot, thus preventing any abnormal discharge of electricity.

Although the present invention has been illustrated and described with reference to the preferred embodiment thereof, it should be understood that it is in no way limited to the details of such embodiment but is capable of numerous modifications within the scope of the appended claims.

What is claimed is:

1. An enclosed battery charger comprising a seat, a cover and a conductive metal plate means, one side of said seat being provided with a first pair of oppositely facing vertically grooved supports for receiving a first conductive metal plate, a side opposite to said one side of said seat being provided with second and third pairs of oppositely facing vertically grooved supports for receiving second and third conductive metal plates respectively, both lateral walls of said seat and an upper portion of a front wall of said seat being provided with ribs, said cover being provided with a rib corresponding to those of said seat, so that said cover may slidably move along said ribs of said seat, said front wall further having a hole for passage of a lead wire therethrough, wherein said seat is provided with a partition which has an end thereof extending upwardly to from a partition rib for preventing contact between the second and third conductive metal plates; said front wall is projectingly provided with an inverted-L shaped hook piece; a rear wall of said seat is provided with an engaging hole opposite to said front wall; an inner side of said rib of said cover is provided with a rib section, said rib section and said rib of said cover enclosing said rib of said seat, and a hook piece is formed at said cover at a position corresponding to said engaging hole, and a slot is provided in said cover for receiving said inverted-L shaped hook piece of said front wall of said seat.

2. An enclosed battery charger as claimed in claim 1, wherein said seat is provided with a partition post and said cover is provided with a hole for passage of a screw therethrough into said said partition post.

3. An enclosed battery charger as claimed in claim 2, wherein said front wall of said seat is provided with an opening for receiving a push-button switch which projects therefrom, said switch being provided with a lug at a rear side thereof, and a metal piece is fitted with a positioning post, one end thereof being capable of pressing one end of said metal piece when said switch displaces, so that one end of said metal piece contacts said conductive metal plate means to connect electricity.

4. An enclosed battery charger as claimed in claim 1, wherein said seat is further provided with a post around which the lead wires may pass before exit through said hole in said front wall so as to prevent the lead wires from detaching from said conductive metal plate means due to forceful pulling at the lead wires.

5. An enclosed battery charger as claimed in claim 1, wherein said cover is provided with an elongated slot at a position corresponding to that of said conductive metal plate means for receiving an insulated plate which is disposed, between the batteries and said conductive metal plate means for preventing abnormal electricity discharge.

6. An enclosed battery charger as claimed in claim 5, wherein said insulated plate is formed of foldable high-molecular sheet for adhering to said cover.

* * * * *